US007289974B2

(12) United States Patent
Godeby et al.

(10) Patent No.: US 7,289,974 B2
(45) Date of Patent: Oct. 30, 2007

(54) SYSTEM AND METHOD FOR DATA RECONCILIATION

(75) Inventors: Frank Godeby, Bethesda, MD (US); Wolfgang Hahn, Washington, DC (US); James Tasker, Ottawa (CA)

(73) Assignee: SAP AG, Walldorf (DE)

( * ) Notice: Subject to any disclaimer, the term of this patent is extended or adjusted under 35 U.S.C. 154(b) by 468 days.

(21) Appl. No.: 10/654,968

(22) Filed: Sep. 5, 2003

(65) Prior Publication Data
US 2005/0055324 A1    Mar. 10, 2005

(51) Int. Cl.
G06F 7/00 (2006.01)
G06F 17/30 (2006.01)
(52) U.S. Cl. .................. 707/1; 707/6; 705/30
(58) Field of Classification Search ...................... None
See application file for complete search history.

(56) References Cited

U.S. PATENT DOCUMENTS

| | | | | |
|---|---|---|---|---|
| 5,134,564 A * | 7/1992 | Dunn et al. | ........... | 705/33 |
| 5,341,476 A * | 8/1994 | Lowell | ........... | 709/219 |
| 5,404,509 A * | 4/1995 | Klein | ........... | 707/101 |
| 5,666,524 A * | 9/1997 | Kunkel et al. | ........... | 707/3 |
| 6,857,053 B2 * | 2/2005 | Bolik et al. | ........... | 711/162 |
| 6,865,655 B1 * | 3/2005 | Andersen | ........... | 711/162 |
| 2001/0016853 A1 * | 8/2001 | Kucala | ........... | 707/204 |
| 2003/0009438 A1 * | 1/2003 | Achiwa et al. | ........... | 707/1 |
| 2003/0208405 A1 * | 11/2003 | Putman et al. | ........... | 705/16 |
| 2003/0220747 A1 * | 11/2003 | Vailaya et al. | ........... | 702/19 |
| 2004/0059628 A1 * | 3/2004 | Parker et al. | ........... | 705/12 |
| 2005/0246274 A1 * | 11/2005 | Abbott et al. | ........... | 705/40 |

* cited by examiner

*Primary Examiner*—Tim Vo
*Assistant Examiner*—Jay Morrison
(74) *Attorney, Agent, or Firm*—Kenyon & Kenyon LLP

(57) ABSTRACT

Embodiments of the present invention provide a system and method for data reconciliation. In one embodiment, information identifying data sources to be reconciled may be received. Data may be retrieved from a first data source based on a dynamic link identifying data in the first data source and data from a second data source may be retrieved based on a dynamic link identifying data in the second data source. A first portion of a reconciliation rule may be processed using the retrieved data from the first data source to generate a first result. A second portion of the reconciliation rule may be processed using the retrieved data from the second data source to generate a second result. The first result may be compared with the second result. If the first result matches the second result, it may be confirmed that data in the first data source is reconciled with the data in the second data source.

49 Claims, 5 Drawing Sheets

FIG. 2

| Basic Data | Documentation | Rule Usage |

Slice ID: FM PMT 9    Slice Name: FMA Payments for 9000
Provider ID: FMA    Short Name: FMA Pmt 9000

Calculation Settings
Amount Field: 
Opening Balance: E Exclude opening balance

Derivation Settings
Subtotal: Deriv    FM PMT 9
Unmatched Flag: U Include as "Unassigned"

Created by: C5035353    Entered on: 19.11.2002
Changed by: C5035353    Changed on: 10.12.2002

{ 220

Initial Data Selection

| Field name | In/Exclude | Comparison | From | To |
|---|---|---|---|---|
| COMMITMENT ITEM | Exclude | Equal | REVENUE | |
| ITEM CATEGORY | Include | Equal | 3 | |
| LEDGER | Include | Range | 9A | 9B |
| RECORD TYPE | Include | Equal | 0 | |
| STATISTICAL ID | Include | Equal | | |
| VAL.TYP | Include | Range | 50 | 82 |
| VERSION | Include | Equal | 0 | |

Reconciliation Analysis: BL Resource to BCS entry documents 9000

| Subtotal/Fund/Period | | BL Res 9000 | | bcs entry 9000 | Difference |
|---|---|---|---|---|---|
| ▽ ▭ Total | | 35.378.300,00 | = | 35.378.310,00 | 10,00- |
| ▷ ▭ APPORTIONMENTS AVAILABLE | | 326.584.140,00- | = | 326.584.140,00- | |
| ▷ ▭ 0100DA-02 | | 291.450.060,00 | = | 291.450.060,00 | |
| ▷ ▭ 0100DB-02 | | 8.000.000,00 | = | 8.000.000,00 | |
| ▷ ▭ 0101-0203 | | 39.000.000,00 | = | 39.000.000,00 | |
| ▷ ▭ 0105-X | | 16.000.000,00 | = | 16.000.000,00 | |
| ▷ ▭ 0200D-X | | 20.000.080,00 | = | 20.000.080,00 | |
| ▷ ▭ 4050-X | | 134.000.000,00 | = | 134.000.000,00 | |
| ▷ ▭ APPORTIONMENTS UNAVAILABLE | | 10,00- | + | 0,00 | 10,00- |
| ▷ ▭ 0100DA-02 | | 10,00- | + | 0,00 | 10,00- |
| ▭ 01 | | 10,00- | + | 0,00 | 10,00- |

400

420

440

SYSTEM AND METHOD FOR DATA RECONCILIATION

TECHNICAL FIELD

The present invention relates to data reconciliation. In particular, embodiments of the present invention provide a system and method for reconciling information such as business information.

BACKGROUND OF THE INVENTION

Companies often use a data reconciliation process to compare and/or verify data from different data sources. The data in these sources may be stored in different technical structures but may be linked. For example, data may be sorted into subset data but may be derived from a common master data set. The reconciliation process may be used to verify that the subset data is accurate which may also provide a verification of the accuracy of the master data set. Examples of a subset data sources include accounting ledgers, inventory listings, or the like that may be derived from a common set of data.

One goal of the reconciliation process may be to identify data in one subset that does not reconcile with data in another subset, even though both subsets are derived from the same master data set. Violations may occur due to customization errors, data entry errors, program errors, etc. This reconciliation process can also be part of a periodic audit.

Conventional reconciliation programs do not provide a flexible interface to customize the technical structure of the data source and/or the connection between the data. As a consequence, these programs are limited for use with only two specific data sources. Moreover, known reconciliation processes are further limited to pre-determined rules or checks of data dependencies that do not provide any flexibility for different customer requirements.

A more robust and flexible reconciliation process is needed.

BRIEF DESCRIPTION OF THE DRAWINGS

Embodiments of the present invention are illustrated by way of example, and not limitation, in the accompanying figures in which like references denote similar elements, and in which:

FIG. 2 is a screen snapshot of a computer display in accordance with an embodiment of the invention;

FIG. 4 is a screen snapshot of a computer display in accordance with an embodiment of the invention.

DETAILED DESCRIPTION

Embodiments of the present invention provide a data reconciliation tool that may be applied to management of business data, for example. In one embodiment, the invention may be capable of analyzing a variety of different subset data sources that may be generated from a single master data set to determine whether the subset data is accurate and/or reconciles with each other and/or the master data set.

Embodiments of the present invention may provide an efficient reconciliation tool that can be used on daily, weekly, monthly, yearly, etc. update cycles.

Embodiments of the present invention provide a system and method for data reconciliation. In one embodiment, information identifying data sources to be reconciled may be received. Data may be retrieved from a first data source based on a dynamic link identifying data in the first data source and data from a second data source may be retrieved based on a dynamic link identifying data in the second data source. A first portion of a reconciliation rule may be processed using the retrieved data from the first data source to generate a first result. A second portion of the reconciliation rule may be processed using the retrieved data from the second data source to generate a second result. The first result may be compared with the second result. If the first result matches the second result, it may be confirmed that data in the first data source is reconciled with the data in the second data source.

Figure 1:
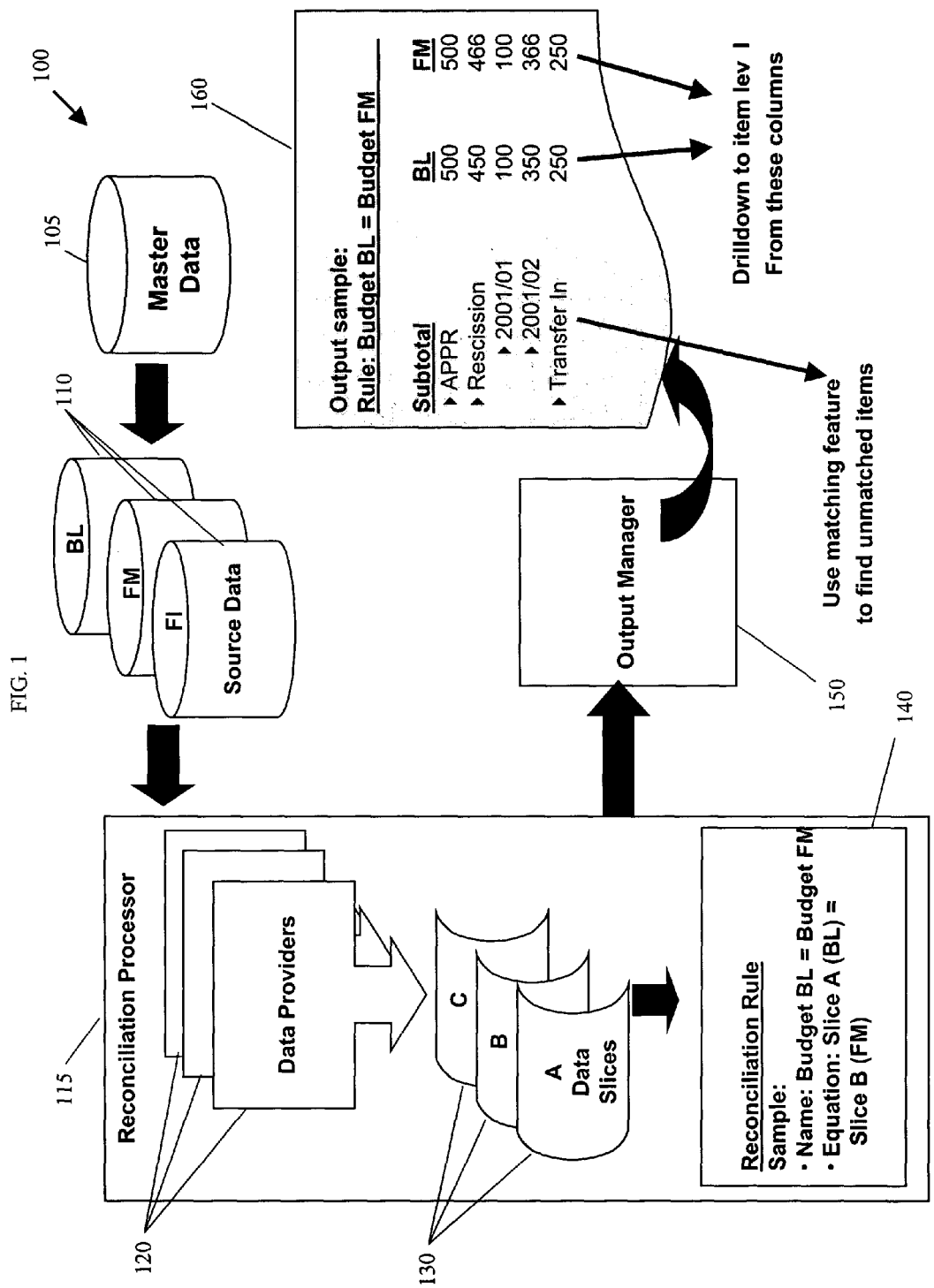
FIG. 1 is a block diagram of a system that may utilize aspects of the invention.

FIG. 1 is a diagram illustrating a reconciliation system 100 in which embodiments of the present invention may find application. As shown, FIG. 1 may include one or more data sources 110 that may be derived from a master data set 105 such as pay roll run, etc. Master data 105 may include any type of raw data that is input by a user or generated as a result of a process. Examples include payroll results, data from billing documents, etc. As the raw data is sorted, the resulting sort data tables may represent the subset data sources 110. The source data 110 may be sorted and/or collected in different ways. Examples of such source data include budgetary ledger, standard general ledger, or the like. Data from the subset data 110 may be input to reconciliation processor 115 that may process the data and generate an output such as a report or the like via an output manager 150.

In embodiments of the present invention, the data sources 110 may include financial (FI) data, funds management (FM) data, business ledger (BL) data, and/or any other type of data. The source data 110 may be input to the reconciliation processor 115 where one set of source data (e.g., FM) may be compared with another set of source data (e.g., BL) to verify that the data contained in the various data sources 110 reconciles with each other.

In embodiments of the present invention, a plurality of data providers 120 may be provided. The data providers 120 may provide a dynamic link to the data included in the data sources 110. This dynamic link may describe and/or identify the data and specify how to read the data. This dynamic link may be used to access or retrieve data that is identified by a user's input. The data providers 120 may dynamically provide access to user selected data included in the data sources 110 and identify the selected source data to the reconciliation process. This user selected data may be used when a reconciliation rule is checked during the reconciliation process. For example, the data providers 120 may define various fields included in the data sources 110 as well coding information that may define a routine to read the data from the data sources 110 when the reconciliation process is run. Moreover, the data providers 120 may contain mapping information that may map to fields in the data sources 110 defined for reconciliation, in accordance with embodiments of the present invention.

In embodiments of the present invention, the data slices 130 may be based on user define inputs that define a portion of source data the user may want to reconcile.

Embodiments of the present invention may provide a flexible and customizable reconciliation tool that can permit users to select data from various data sources. The data can be evaluated based on user defined rules to determine whether, for example, data from one source reconciles with data in another source.

For example, if one of the data sources 110 is a budgetary ledger (BL) with fields such as "Accounts," "Funds Center," etc., one or more of the data providers 120 may define the fields included in the data source and may further include a routine that can dynamically read data from the various fields during run time. The one or more data slices 130 may be based on user inputs and may define which accounts in the Account field and/or which data in the Fund Center field the user wishes to select for reconciliation. For example, one or more data slices 130 may be used as an operand in a reconciliation equation (to be described below in more detail).

In embodiments of the present invention, one or more of the data slices 130 may be applied to a reconciliation rule such as the sample rule 140 that includes a reconciliation equation as shown. The reconciliation equation may represent user-defined rules that may identify the information from the data sources 110 that the user wishes to reconcile. For example, a user may wish to define a rule that reconciles data from one of the data sources 110 such as Budget Ledger (BL) with another data source such as Funds Management (FM). The user may wish to compare the budgetary figures in the BL (e.g., Budget BL) with the budgetary figures in the FM (e.g., Budget FM). Slice A may be based on a user input that identifies the selected the budgetary figures in the BL data source and slice B may be based on a user input that identifies the selected budgetary figures in FM data source.

In accordance with embodiments of the present invention, the reconciliation equation may be "Slice A (BL)=Slice B (FM)," where Slice A (BL) may be referred to as the left side of the equation while the Slice B (FM) may be referred to as the right side of the equation. The data providers 120 may provide the link to the data in the data sources 110 as identified by the slices 130 included in the reconciliation equation. As indicated above, the data providers 120 may provide a dynamic link to the data in the data sources 110. As indicated above, the dynamic link provided by the data providers 120 may describe the data and specify how to read the data.

Thus, in accordance with embodiments of the present invention, the data identified by the user can be dynamically identified and/or retrieved from its respective source data 110. Thus, in this example, the data identified by each data slice 130 (e.g., Slice A and Slice B) may be retrieved from its respective source data 110 (e.g., BL and FM) based on the dynamic link provided by the data providers 120. The appropriate mathematical operation may be performed by the reconciliation processor 115 using the retrieved data identified by the each data slice. The mathematical operations may be one or more user defined operations and/or may be pre-defined mathematical operations. The reconciliation processor 115 may generate a result for each side of the reconciliation equation. The result for each side may be compared to each other and if the results are the same, the processor 115 may indicate that the data in the selected data source 110 (e.g., BL and FM) reconciles. If the results are not the same, the processor 115 may indicate that the data in the selected data source 110 (e.g., BL and FM) does not reconcile.

In embodiments of the present invention, the output manager 150 may output a sample report 160 that may output results of the reconciliation process. The sample report 160 may show, for example, sub-totals for each respective category for each side of the reconciliation equation (e.g., Slice A (BL) and Slice B (FM). In embodiments of the present invention, each entry in the report 160 may be selected to retrieve further details with respect to the entry. For example, a drill down feature may be available to provide detailed information for each item in each column (e.g., columns BL and FM) and the report 160 may provide further information for unmatched items.

During evaluation of a reconciliation rule, the data providers 120 may provide a selection screen to allow modification for the initial data selection for a particular data slice when a reconciliation report is run and may also read data sources to determine initial set of data for the slice. In embodiments of the present invention, the data providers may call a derivation process to group data into subtotals and/or to perform additional filtering. The data providers 120 may further load item level data when requested to support drill-down and/or item level matching processes.

Embodiments of the present invention provide a flexible and customizable data reconciliation tool that can permit a user to select any type of data from one or more data sources that the user desires to reconcile. The invention may permit users to define reconciliation rules that may be processed by the system for data reconciliation. Outputs of the reconciliation process, in accordance with embodiments of the invention, may be generated in the form of reports that may further provide detailed information so that data inconsistencies may be readily identified.

FIG. 2 shows an exemplary display 200 that may be presented to a user of the reconciliation system to define one or more data slices 130, in accordance with embodiments of the present invention. As indicated above, one or more data slices 130 may be used as an operand in a reconciliation equation and may be dynamically linked to the data in the data sources 110 by one or more data providers 120. The data providers may dynamically load data for the corresponding data slice from the appropriate data source when the reconciliation process is implemented. The data slices 130 may also identify the criteria for the data to be included in the slice. The data slices 130 may contain a reference to a derivation processor environment that may be used to perform additional filtering and/or to assign each record loaded into the slice into a subtotal. In embodiments of the present invention, all data slices involved in the rule may derive the same list of subtotal texts, when a rule is evaluated, as the reconciliation comparisons occur at that level. The fields available for defining the Initial data selection and/or source fields for the derivation environment may be determined by the data provider.

Referring again to FIG. 2, display 200 may present screen to select basic data associated with a corresponding data slice. It is recognized that additional screens may be associated with the data slice such as documentation and rule usage, for example. The display 200 may include a standard definition section 220 and a sub-screen and field list 240 that may be determined by the data provider. The standard definition section 220 may include fields such as the Slice ID, Provider ID, Slice Name, Short Name, Calculation Settings, Derivation Settings, identification of party creating the data slice as well as a when the data slice was entered, identification of party editing the data slice as well as a when the data slice was edited and/or other information. The fields in this section may be user defined and/or may be pre-defined. In embodiments of the present invention, section 240 may include a field list with entries such as Field Name, Include/Exclude criteria, Comparison type, and data ranges (e.g., From /To), and or other entries.

Figure 3:
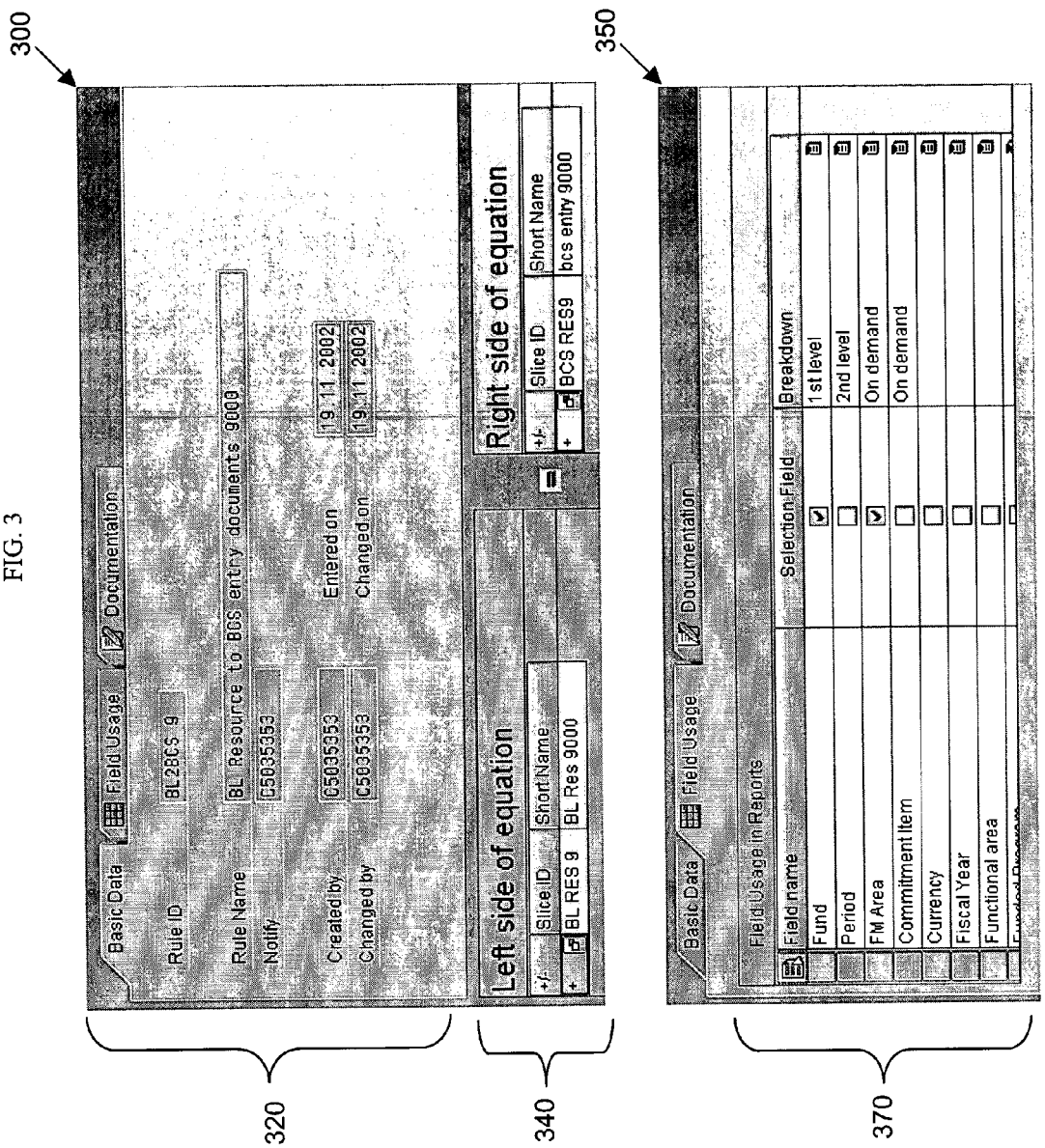
FIG. 3 is a screen snapshots of computer displays in accordance with an embodiment of the invention.

FIG. 3 shows exemplary displays 300 and 350 that may be presented to a user of the reconciliation system to define one or more reconciliation rules 140, in accordance with embodiments of the present invention. The display 300 may include, for example, an identification and administrative data section 230 as well as an input section 340 used to enter information such as operands related to one or more reconciliation equation. Section 320 may include fields such as the Rule ID, Rule Name, identification of notification party in the event reconciliation fails, identification of party creating the rule as well as a when the rule was entered, identification of party editing the rule as well as a when the rule was edited and/or other information. Section 340 may be used to define operands defined by, for example, slice IDs and/or short names for the left side and the right side of the reconciliation equation as well as the operation to perform for the slice data for each side of the equation.

As shown in FIG. 3, section 320 may include a Rule Name entry where the reconciliation rule may be specified. As shown, the rule in this example may compare the BL Resources to BCS entry documents. A user may specify any type of rule and/or identify data resources for which reconciliation is desired. The Notify entry may be used to specify an individual or entity to be notified based on a trigger. The trigger could be set on any event such as when reconciliation is successful or when a reconciliation equation fails to balance and/or any other event. A notification may be sent via e-mail, telephone call, voice mail message, a page, and/or by any other means.

In embodiments of the present invention, a user may specify any number of operands that relate to data slices, data providers and/or data sources that may be included in the reconciliation equation in accordance with embodiments of the present invention. Moreover, any type of operators such as +, −, ×, / and/or any other mathematical operation may be used in the reconciliation equation.

The display 350 may include, for example, section 370 with fields that may be used to define the fields that may be presented in the reconciliation report. Section 370 may include fields such as Field Name, Selection Field, Breakdown information, etc. The fields may be based on the subset of the common reconciliation group fields that may supported by the data providers referenced in the equation. The user may specify which fields to use as selection criteria when running the online report and/or which fields to use for sorting/grouping to provide further breakdowns.

FIG. 4 shows an exemplary display 400 that may be presented to a user of the reconciliation management system showing an exemplary reconciliation report, in accordance with embodiments of the present invention. The display 400 may include a navigation toolbar that may be used to change fields and/or otherwise manage different data related to the reconciliation report. By selecting buttons from the navigation toolbar, a user may sort and/or view the reconciliation report in a variety of different ways as defined by the application program.

In embodiments of the present invention, the display 400 may include section 440 that may detail results of the reconciliation process. Section 440 may include fields such as, for example, sub-totals for each respective category for each side of the reconciliation equation (e.g., Slice A (BL) and Slice B (BCS). The report may further identify fields under each category that do not match as well as the difference between the fields. In embodiments of the present invention, each entry in the report 160 may be selected to retrieve further details with respect to the entry using, for example, a drill down process.

The output manager 150 may provide a plurality of different types of reconciliation reports such as an analysis report, a batch report or other types of report. The reports may be user defined and may provide different structure, analysis and/or grouping of data. For example, the analysis report may evaluate a single rule and provide drill down functionality and/or item-level matching functionality. The batch report, on the other hand, may evaluate a plurality of rules and may issue a notification regarding any rule or rules that may be out of balance (e.g., do not reconcile with each other). It is recognized that these sample reports are given by way of example only and that any type of report having different functionality may be created.

It is recognized that the configuration of exemplary displays 200, 300, 400 and the corresponding description for the data reconciliation application program, in accordance with embodiments of the present invention, is given by example only and that displays 200, 300, and 400 may be configured in any way desirable to display other information, features, selections, links, etc.

Figure 5:
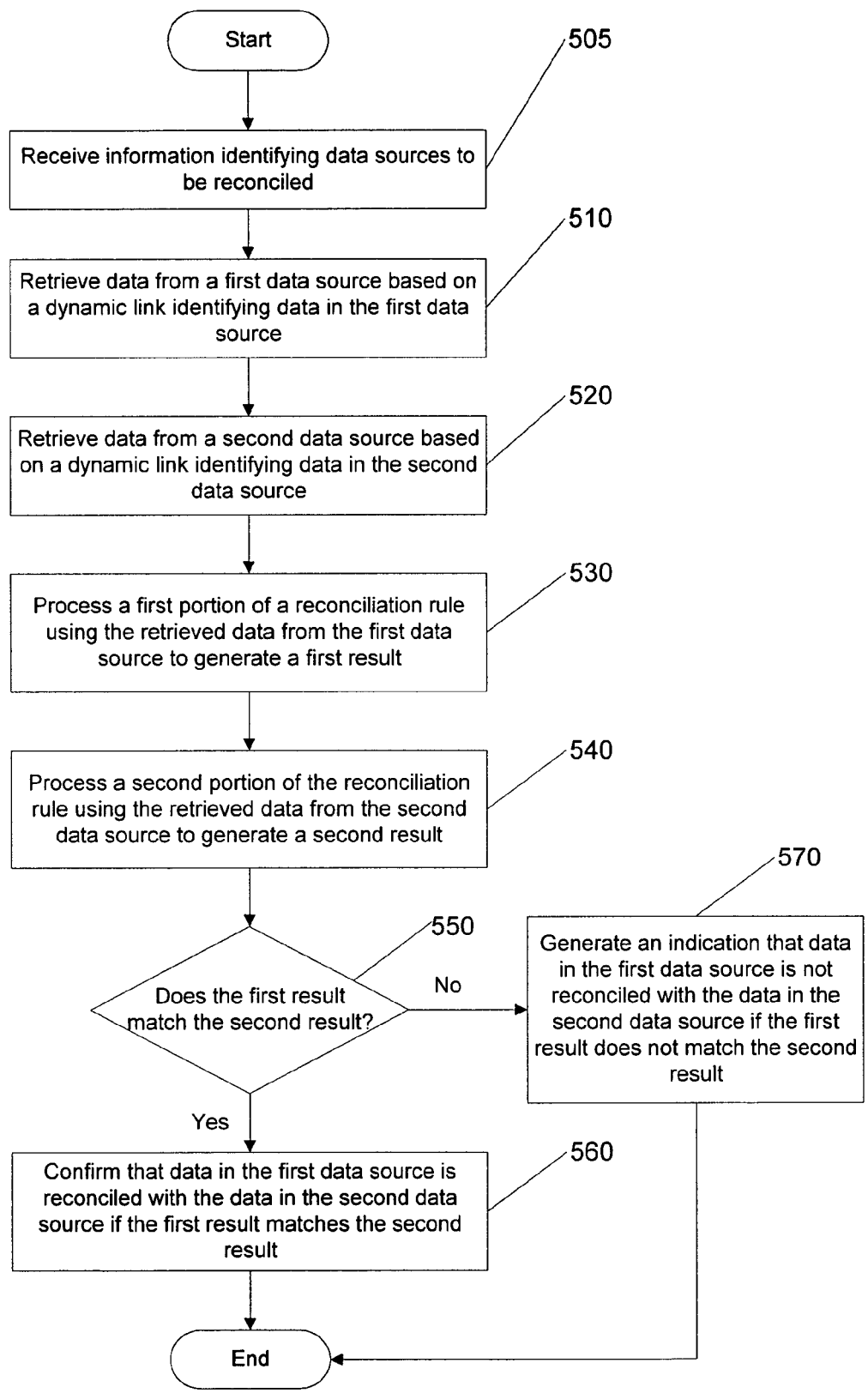
FIG. 5 is a flowchart illustrating a method in accordance with an embodiment of the present invention.

FIG. 5 illustrates a data reconciliation method in accordance with embodiments of the present invention. The process as described herein may be performed by a processor executing instructions from a reconciliation application program in accordance with embodiments of the present invention. In one embodiment, information identifying data sources to be reconciled may be received, as shown in box 505. Data from a first data source may be retrieved based on a dynamic link identifying data in the first data source, as shown in box 510. As shown in box 520, data from a second data source may be retrieved based on a dynamic link identifying data in the second data source. A first portion of a reconciliation rule may be processed using the retrieved data from the first data source to generate a first result and a second portion of the reconciliation rule may be processed using the retrieved data from the second data source to generate a second result, as shown in boxes 530-540. The first result may be compared with the second result and if the first result matches the second result, the data in the first data source may be confirmed as being reconciled with the data in the second data source, as shown in boxes 550-560.

If the first result does not match the second result, an indication may be generated that the data in the first data source is not reconciled with the data in the second data source, as shown in box 570.

It is recognized that the various components of system 100, the related displays as described, as well as the methods described herein may be embodied in and/or employed in a computer network or system. For example, functionality of the reconciliation processor 115, as described herein, may be employed in a system that may include, among other components, one or more processing units, one or more input devices, one or more memory units, and/or one or more display devices. The processing units may include a processor, random access memory (RAM), network interface, input device controller(s), video controller(s), memory unit (s), etc. all interconnected by a common bus such as a system bus.

As is known, input device controllers may receive command signals from input devices and forward the command signals in the appropriate format for processing. A video controller may receive video command signals from the system bus and generates the appropriate video signals that are forwarded to the display device so that the desired display is provided on a display screen. It is recognized that the computer system, in which embodiments of the present invention may be employed, may include a personal digital assistant (PDA) or other handheld device, a terminal, a workstation, other such devices, and/or a combination thereof.

The various data sets, data sources and/or application programs, as described herein with respect to embodiments of the present invention, may be stored in memory units that may be any type of conventional memory units that provide data storage capability. As is conventional, programs may have program instructions that may be loaded into memory such as RAM during operation. A processor may execute the program instructions as required to perform desired program functions. Also, the components just described could be combined or separated in various manners, and could be stored in various manners, such as on various non-volatile storage medium.

Embodiments of the present invention may be reside in a server and may be run on various machines via a network connection. Access to the reconciliation system in accordance with embodiments of the present invention may be provided via for example a local area network (LAN), wide area network (WAN), the Internet, Intranet and/or any other type of network, and/or combination thereof.

System 100 may include one or more software modules and/or program instructions that may provide functionality, as described below, in accordance with embodiments of the present invention. For example, the software modules or instructions may define the various data providers 120 and/or data slices 130 in accordance with embodiments of the present invention. Moreover, the software modules may describe how, for example, reconciliation rules may be generated and/or processed in accordance with embodiments of the present invention. Details of such modules or instructions are not provided since one of ordinary skill will recognize how to generate such modules based on the invention described herein. It is recognized that Interfaces to external tools such as a spreadsheet or the like may be possible so that tables and/or reconciliation reports may be imported and/or exported.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method for reconciling data, comprising:
   receiving information identifying data sources to be reconciled;
   retrieving data from a first data source based on a dynamic link identifying data in the first data source;
   retrieving data from a second data source based on a dynamic link identifying data in the second data source;
   processing a first portion of a reconciliation rule using the retrieved data from the first data source to generate a first result;
   processing a second portion of the reconciliation rule using the retrieved data from the second data source to generate a second result;
   comparing the first result with the second result; and
   storing to memory a reconciliation report, wherein the reconciliation report presents data for selected fields of the first and second data sources, and further automatically provides a first predefined indication if data for corresponding fields are matched and a second predefined indication if data for corresponding fields are not matched.

2. The method of claim 1, wherein the operation of processing a first portion of the reconciliation rule comprises:
   adding a first selected portion of the retrieved data to generate the first result.

3. The method of claim 2, wherein the operation of processing a first portion of the reconciliation rule further comprises:
   subtracting a second selected portion of the retrieved data to generate the first result.

4. The method of claim 1, wherein the operation of processing a second portion of the reconciliation rule comprises:
   adding a first selected portion of the retrieved data to generate the second result.

5. The method of claim 4, wherein the operation of processing a first portion of the reconciliation rule further comprises:
   subtracting a second selected portion of the retrieved data to generate the second result.

6. The method of claim 1, wherein the dynamic link identifying data in the first data source identifies a location of the data in the first data source.

7. The method of claim 6, wherein the dynamic link identifying data in the first data source further identifies a routine to retrieve data from the first data source.

8. The method of claim 1, wherein the dynamic link identifying data in the second data source identifies a location of the data in the second data source.

9. The method of claim 8, wherein the dynamic link identifying data in the second data source further identifies a routine to retrieve data from the second data source.

10. A machine-readable medium having stored thereon a plurality of executable instructions to be executed by a processor to implement a method for reconciling data, the method comprising:
    receiving information identifying data sources to be reconciled;
    retrieving data from a first data source based on a dynamic link identifying data in the first data source;
    retrieving data from a second data source based on a dynamic link identifying data in the second data source;
    processing a first portion of a reconciliation rule using the retrieved data from the first data source to generate a first result;
    processing a second portion of the reconciliation rule using the retrieved data from the second data source to generate a second result;
    comparing the first result with the second result; and
    storing to memory a reconciliation report, wherein the reconciliation report presents data for selected fields of the first and second data sources, and further automatically provides a first predefined indication if data for corresponding fields are matched and a second predefined indication if data for corresponding fields are not matched.

11. The machine-readable medium of claim 10, wherein the operation of processing a first portion of the reconciliation rule comprises:
    adding a first selected portion of the retrieved data to generate the first result.

12. The machine-readable medium of claim 10, wherein the operation of processing a first portion of the reconciliation rule further comprises:
    subtracting a second selected portion of the retrieved data to generate the first result.

13. The machine-readable medium of claim 10, wherein the operation of processing a second portion of the reconciliation rule comprises:
adding a first selected portion of the retrieved data to generate the second result.

14. The machine-readable medium of claim 13, wherein the operation of processing a first portion of the reconciliation rule further comprises:
subtracting a second selected portion of the retrieved data to generate the second result.

15. A system comprising:
first and second data sources;
a processor configured to:
receive information identifying data sources to be reconciled;
retrieve data from a first data source based on a dynamic link identifying data in the first data source;
retrieve data from a second data source based on a dynamic link identifying data in the second data source;
process a first portion of a reconciliation rule using the retrieved data from the first data source to generate a first result;
process a second portion of the reconciliation rule using the retrieved data from the second data source to generate a second result;
compare the first result with the second result; and an output manager configured to store to memory a reconciliation report, wherein the reconciliation report presents data for selected fields of the first and second data sources, and further automatically provides a first predefined indication if data for corresponding fields are matched and a second predefined indication if data for corresponding fields are not matched.

16. A method for reconciling data, comprising:
receiving information identifying data sources to be reconciled;
retrieving data from a first set of data sources based on a dynamic link identifying data in the first set of data sources;
retrieving data from a second set of data sources based on a dynamic link identifying data in the second set of data sources;
processing a first portion of a reconciliation rule using the retrieved data from the first set of data sources to generate a first result;
processing a second portion of the reconciliation rule using the retrieved data from the second set of data sources to generate a second result;
comparing the first result with the second result; and
storing to memory a reconciliation report, wherein the reconciliation report presents data for selected fields of the first and second sets of data sources, and further automatically provides a first predefined indication if data for corresponding fields are matched and a second predefined indication if data for corresponding fields are not matched.

17. The method of claim 16, wherein the operation of processing a first portion of the reconciliation rule comprises:
adding a first selected portion of the retrieved data to generate the first result.

18. The method of claim 17, wherein the operation of processing a first portion of the reconciliation rule further comprises:
subtracting a second selected portion of the retrieved data to generate the first result.

19. The method of claim 16, wherein the operation of processing a second portion of the reconciliation rule comprises:
adding a first selected portion of the retrieved data to generate the second result.

20. The method of claim 19, wherein the operation of processing a first portion of the reconciliation rule further comprises:
subtracting a second selected portion of the retrieved data to generate the second result.

21. The method of claim 16, wherein the dynamic link identifying data in the first set of data sources identifies a location of the data in the first set of data sources.

22. The method of claim 21 wherein the dynamic link identifying data in the first set of data sources further identifies a routine to retrieve data from the first set of data sources.

23. The method of claim 16, wherein the dynamic link identifying data in the second set of data sources identifies a location of the data in the second set of data sources.

24. The method of claim 23, wherein the dynamic link identifying data in the second set of data sources further identifies a routine to retrieve data from the second set of data sources.

25. A machine-readable medium having stored thereon a plurality of executable instructions to be executed by a processor to implement a method for reconciling data, the method comprising:
receiving information identifying data sources to be reconciled;
retrieving data from a first set of data sources based on a dynamic link identifying data in the first set of data sources;
retrieving data from a second set of data sources based on a dynamic link identifying data in the second set of data sources;
processing a first portion of a reconciliation rule using the retrieved data from the first set of data sources to generate a first result;
processing a second portion of the reconciliation rule using the retrieved data from the second set of data sources to generate a second result;
comparing the first result with the second result; and
storing to memory a reconciliation report, wherein the reconciliation report presents data for selected fields of the first and second sets of data sources, and further automatically provides a first predefined indication if data for corresponding fields are matched and a second predefined indication if data for corresponding fields are not matched.

26. The machine-readable medium of claim 25, wherein the operation of processing a first portion of the reconciliation rule comprises:
adding a first selected portion of the retrieved data to generate the first result.

27. The machine-readable medium of claim 25, wherein the operation of processing a first portion of the reconciliation rule further comprises:
subtracting a second selected portion of the retrieved data to generate the first result.

28. The machine-readable medium of claim 25, wherein the operation of processing a second portion of the reconciliation rule comprises:
adding a first selected portion of the retrieved data to generate the second result.

29. The machine-readable medium of claim 28, wherein the operation of processing a first portion of the reconciliation rule further comprises:
    subtracting a second selected portion of the retrieved data to generate the second result.

30. A system comprising:
    first and second sets of data sources;
    a processor configured to:
        receive information identifying data sources to be reconciled;
        retrieve data from a first set of data sources based on a dynamic link identifying data in the first set of data sources;
        retrieve data from a second set of data sources based on a dynamic link identifying data in the second set of data sources;
        process a first portion of a reconciliation rule using the retrieved data from the first set of data sources to generate a first result;
        process a second portion of the reconciliation rule using the retrieved data from the second set of data sources to generate a second result;
        compare the first result with the second result; and
    an output manager configured to store to memory a reconciliation report, wherein the reconciliation report presents data for selected fields of the first and second sets of data sources, and further automatically provides a first predefined indication if data for corresponding fields are matched and a second predefined indication if data for corresponding fields are not matched.

31. A computer implemented method for data reconciliation, comprising:
    retrieving a first set of data from a first data source using a first dynamic link and retrieving a second set of data from a second data source using a second dynamic link, wherein the first and second data sources are functionally independent and the first and second sets of data are generated as a result of the same transaction;
    forming a reconciliation equation comprising the first and second sets of data;
    evaluating the reconciliation equation; and
    outputting a reconciliation report based on evaluation of the reconciliation equation, wherein the reconciliation report presents data for selected fields of the first and second sets of data sources, and further automatically provides a first predefined indication if data for corresponding fields are matched and a second predefined indication if data for corresponding fields are not matched.

32. The method of claim 31, wherein the first dynamic link identifies criteria for determining data of the first data source to include in the first set of data and the second dynamic link identifies criteria for determining data of the second data source to include in the second set of data.

33. The method of claim 31, wherein the first dynamic link specifies retrieval of the first set of data and the second dynamic link specifies retrieval of the second set of data.

34. The method of claim 31, wherein forming comprises specifying an operator of the reconciliation equation.

35. The method of claim 31, wherein evaluating comprises:
    processing the first set of data to generate a first reconciliation result; and
    processing the second set of data to generate a second reconciliation result.

36. The method of claim 31, wherein outputting comprises providing further details on individual components of the first and second sets of data.

37. The method of claim 31, wherein outputting comprises outputting the reconciliation report in accordance with user-defined preferences.

38. The method of claim 1, wherein the first predefined indication is a graphical symbol of a first type and the second predefined indication is a graphical symbol of a second type.

39. The method of claim 38, wherein the graphical symbol of the first type is an equal to sign and the graphical symbol of the second type is a not equal to sign.

40. The machine-readable medium of claim 10, wherein the first predefined indication is a graphical symbol of a first type and the second predefined indication is a graphical symbol of a second type.

41. The machine-readable medium of claim 40, wherein the graphical symbol of the first type is an equal to sign and the graphical symbol of the second type is a not equal to sign.

42. The system of claim 15, wherein the first predefined indication is a graphical symbol of a first type and the second predefined indication is a graphical symbol of a second type.

43. The system of claim 42, wherein the graphical symbol of the first type is an equal to sign and the graphical symbol of the second type is a not equal to sign.

44. The method of claim 16, wherein the first predefined indication is a graphical symbol of a first type and the second predefined indication is a graphical symbol of a second type.

45. The method of claim 44, wherein the graphical symbol of the first type is an equal to sign and the graphical symbol of the second type is a not equal to sign.

46. The machine-readable medium of claim 25, wherein the first predefined indication is a graphical symbol of a first type and the second predefined indication is a graphical symbol of a second type.

47. The machine-readable medium of claim 46, wherein the graphical symbol of the first type is an equal to sign and the graphical symbol of the second type is a not equal to sign.

48. The system of claim 30, wherein the graphical symbol of the first type is an equal to sign and the graphical symbol of the second type is a not equal to sign.

49. The method of claim 48, wherein the first predefined indication is a graphical symbol of a first type and the second predefined indication is a graphical symbol of a second type.

* * * * *